No. 669,958. Patented Mar. 12, 1901.
N. C. HODGKINS.
GAS SEPARATOR FOR DIGESTERS.
(Application filed May 16, 1899. Renewed Jan. 11, 1901.)
(No Model.)
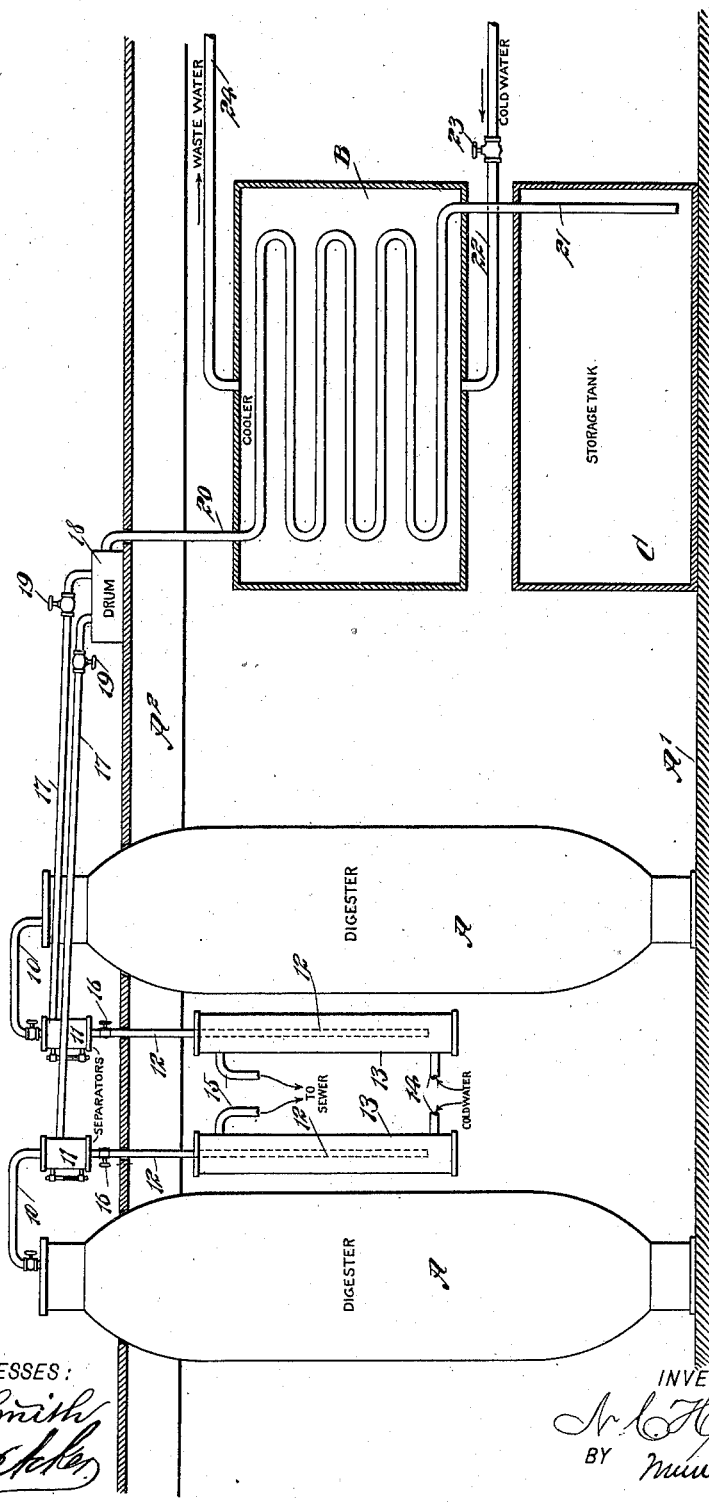

UNITED STATES PATENT OFFICE.

NELSON C. HODGKINS, OF LISBON FALLS, MAINE, ASSIGNOR TO HIMSELF, AND LEWIS H. SANFORD, OF AUGUSTA, MAINE.

GAS-SEPARATOR FOR DIGESTERS.

SPECIFICATION forming part of Letters Patent No. 669,958, dated March 12, 1901.

Application filed May 16, 1899. Renewed January 11, 1901. Serial No. 42,909. (No model.)

*To all whom it may concern:*

Be it known that I, NELSON C. HODGKINS, of Lisbon Falls, in the county of Androscoggin and State of Maine, have invented a new and Improved Reclaimer for Pulp-Mills, of which the following is a full, clear, and exact description.

One object of the invention is to provide a gas-reclaimer for pulp-mills which will be exceedingly simple and economic in construction and quick-acting and effective in operation.

Another object of the invention is to provide each digester with an independent separator and trap and to provide means for connecting the various separators with a drum, the connections being so made that any digester may be cut off from the drum, and, furthermore, to provide a cooling connection between the drum and a storage-tank.

The invention consists in the novel construction and combination of the several parts, as will be hereinafter fully set forth, and pointed out in the claims.

Reference is to be had to the accompanying drawing, forming a part of this specification, in which is represented a section through an apartment, showing the digesters, separators, and traps in side elevation and the cooling-chamber and storage-tank in section.

A A represent two digesters, each provided at the top with a vent-pipe 10, and each vent-pipe 10 is connected with a separator 11. A pipe 12 is carried from each separator to a receptacle 13, closed at the top and at the bottom, and said pipes 12 from the separators extend nearly to the bottoms of the receptacles. Each receptacle is supplied at its bottom with cold water through the medium of a pipe 14, and each receptacle 13 is also provided at its upper portion with an outlet-pipe 15, leading to a sewer, and through which the waste liquor and water are discharged. The cold water flowing up through the receptacle 13, around the pipe 12 therein, cools the liquor, and at the same time a trap is formed, acting to arrest the gas.

When venting a digester, until the liquor begins to turn a reddish color the liquor is as strong, minus a very small per cent., as when first introduced into the digester. However, when the liquid shows a reddish color, indicating it has lost its strength and contains only a small per cent. of gas, it is desirable that even such small percentage should be saved. To that end the trap 13 is provided. A valve 16 is provided in each pipe 12 between a separator and the trap 13 connected with the separator, and such valve 16 is normally closed. While saving the small percentage of gas, the worthless liquid is permitted to escape. The capacity of the pipes 12 is about four times greater than requisite for the amount of liquid required to pass through them. Thus when the liquid in a separator shows reddish the valve 16 is opened, and when in consequence the slightly gaseous liquid passes through the cold water in the trap 13, there being little pressure on the separator, the gas released by the cold water will rise, and following the line of least resistance returns to the separator through a pipe 12, while the refuse liquid flows to the sewer or is otherwise disposed of. The valve 16 is then closed. The pipes 12 are straight, and only one is employed in connection with each digester. The pipes 12 may be readily and expeditiously removed and others substituted when it is needful to cleanse the pipes. Under such a construction the pipes do not become clogged, which often happens under the old construction, frequently rendering it necessary to shut down an entire line of digesters or vent directly into the air or sewer.

Under the improved construction it is obvious that the gas is reclaimed from the liquor of each digester separately. Therefore, should an accident happen to any digester the others will not be affected. Furthermore, by providing an independent separator 11 for each digester A far better results are attained than heretofore, the acid obtained having depreciated in strength to but a slight degree.

Each separator 11 is connected with a drum 18 through the medium of a pipe 17, and each pipe 17 is provided with a valve 19, so that any individual separator may be cut off from the drum 18. A pipe 20, preferably of lead, is connected with the drum, and this pipe 20 is coiled in a cooling-chamber B, and the lower end 21 of the coil of pipe 20 is passed out from the cooling-chamber and entered into a storage-tank C. Cold water is supplied through a pipe 22 to the bottom portion of the cooling-chamber, said pipe 22 having a suitable valve 23, and a pipe 24 for waste water is connected with the top portion of the cooler.

Cold water continually flows into the cooling-chamber B and out of said chamber around the coils in the pipe 20, cooling the gas and liquor to the required temperature. By cooling to the proper temperature before introducing the liquor and gas to the storage-tank I do away with a number of reclaiming-tanks and also save the power needed in pumping acid from one tank to another to effect cooling under the ordinary process.

Having thus described my invention, I claim as new and desire to secure by Letters Patent—

1. In a reclaimer for pulp-mills, a digester, a separator connected with said digester, a receptacle having inlet and outlet pipes whereby cold water is circulated through the receptacle, and a pipe leading from the separator into the receptacle, and opening into the latter, as and for the purpose set forth.

2. In a reclaimer for pulp-mills, a digester, a separator connected therewith, means for conducting the gas from said separator to a suitable storage-tank, a receptacle below said separator, said receptacle being closed at both top and bottom, and having inlet and outlet pipes whereby cold water is circulated through the receptacle, and a pipe leading from the bottom of the separator down through the top of said receptacle and opening into the receptacle near the bottom thereof, as and for the purpose set forth.

3. In a reclaimer for pulp-mills, a digester, a separator connected therewith, means for conducting the gas from said separator into a suitable tank, a receptacle below said separator, said receptacle being closed at the top and bottom and having an inlet-pipe near its bottom and an outlet-pipe near its top whereby cold water is circulated up through the receptacle, and a straight pipe leading from the bottom of the separator down through the top of the receptacle and opening into the latter near the bottom thereof, said pipe having a valved connection with the interior of the separator, as and for the purpose set forth.

NELSON C. HODGKINS.

Witnesses:
LEWIS SELBING,
L. S. LEWIS.